Sept. 22, 1959   A. K. VELAN   2,905,192
GATE VALVE
Filed Sept. 23, 1957   2 Sheets-Sheet 1
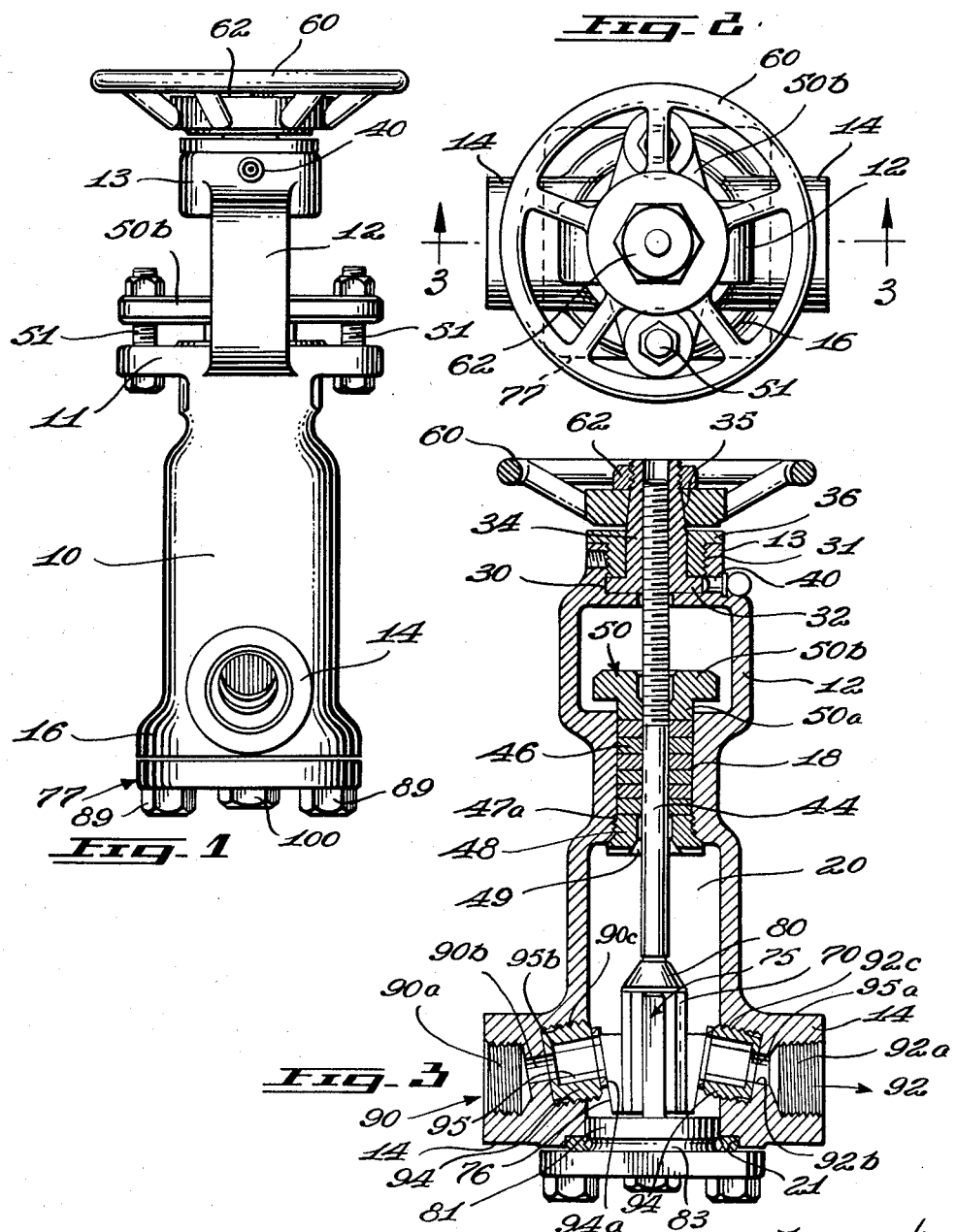
Inventor
Adolf K. VELAN
By
Attorney

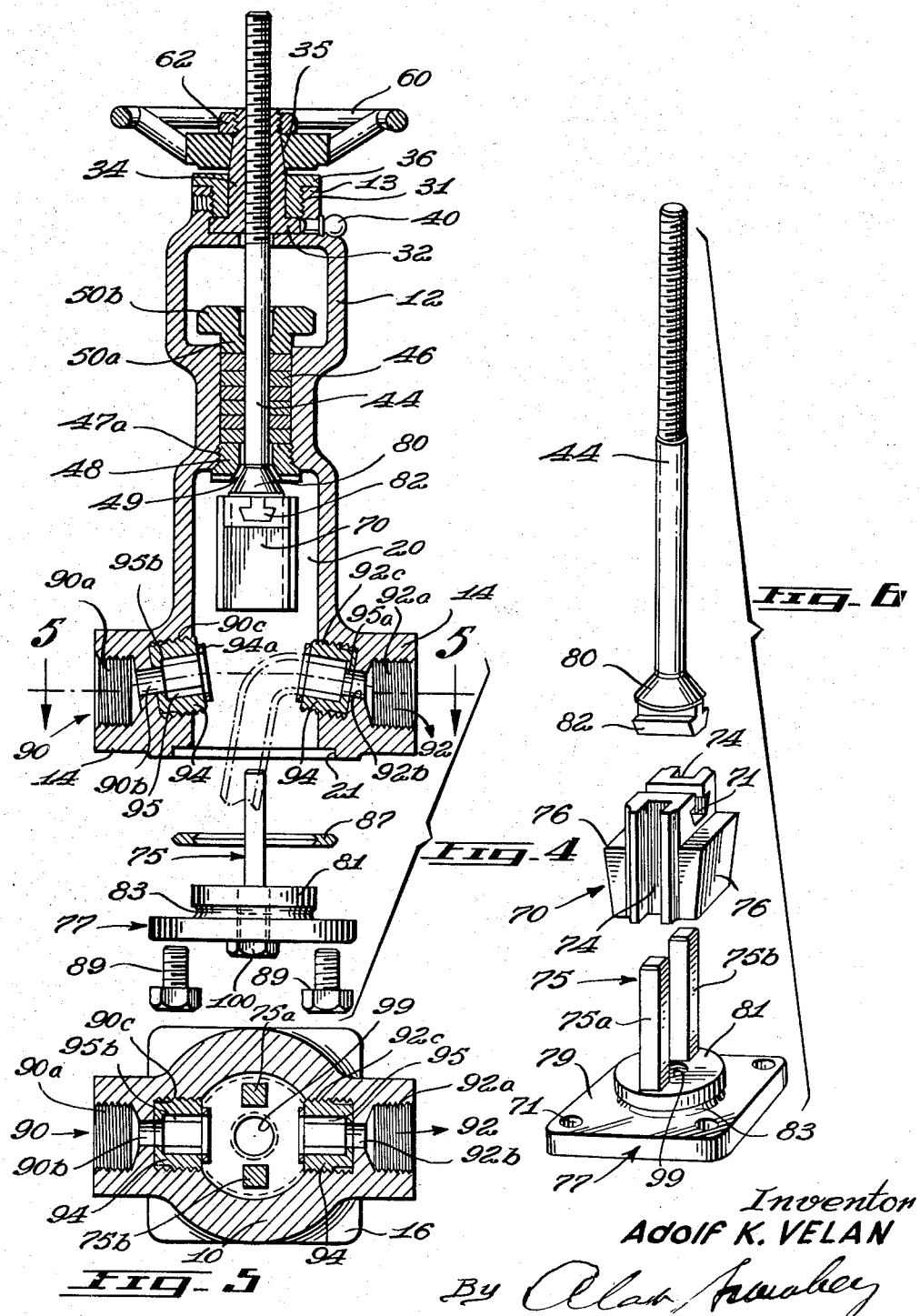

United States Patent Office 2,905,192
Patented Sept. 22, 1959

2,905,192

GATE VALVE

Adolf Karel Velan, Montreal, Quebec, Canada

Application September 23, 1957, Serial No. 685,513

5 Claims. (Cl. 137—315)

The present invention relates to improvements in the construction of gate valves and more particularly to a gate valve construction for high pressure service embodying means whereby servicing and repairs can be accomplished in line service.

At the present time forged steel gate valves are used in sizes from ½" up to 2" in large quantities in oil refineries, chemical industries, and power plants, for pressures running up to about 800 p.s.i. In exceptional cases, the pressures will run to about 1500 p.s.i. and even higher.

The available gate valves are all basically of the same construction and embody a bonnet-body joint of varying design. In these known valve structures the common arrangement is to have the valve seats in the body and the gate and stem engaged in the bonnet. The body and bonnet joint is usually secured by bolts and every time such a valve is closed stresses are induced in the bolting material responsible for the tightness of the body-bonnet joint. Due to high pressure and temperature these stresses are increased causing elongation or stretch in the bolts permitting leakage between valve bonnet and bonnet and costly maintenance and service for this type of valve.

Further, with the usual two-part construction the bonnet must be removed for repairs or servicing of the valve stem or gate and if such servicing involves the usual opposed valve seats within the valve body the entire valve must be removed from the line. As these valves are often welded into the high-pressure lines this means the lines must be cut and re-welded when a new valve is required. This is a costly and time-consuming operation.

The present invention aims to provide a solution to these problems by furnishing a gate valve construction which is designed so that the valve stem, gate, and valve seats are located in the same body eliminating entirely the stress problem in standard valves and all working parts including seats, gate, back seat and stem, can be removed for service and repair from the valve body without breaking the connection of the valve from its installed position.

Accordingly, the invention is a gate valve construction including a one-piece main valve body provided with an internal axial recess constituting a fluid chamber. The axial recess extends through the body and valve stem actuating and supporting means are mounted within the body axial recess at one end so as to engage and support an elongated valve stem for reciprocal axial movement within said body fluid chamber. The valve body is also provided with opposed borings leading transversely into said fluid chamber and constituting fluid inlet and outlet passages respectively and a pair of diagonally opposed valve seats are mounted in the inner end of said fluid passages. A tapered gate valve having opposed seating surfaces corresponding to and adapted to seat on said valve seats is mounted on the lower end of the elongated valve stem. This gate valve is guided in its travel relative to said valve seats by a bifurcate gate guiding means extending from a valve body closure member which is mounted on and seals off the lower end of the valve body forming the bottom wall of the fluid chamber. The gate guiding means extends upwardly and inwardly of the fluid chamber so as to slidably engage the valve gate and maintain it in alignment with the opposed valve seats during its reciprocal travel between open and closed position.

This arrangement is a main feature of the present invention since as the closure member and gate guiding means can be removed from the lower portion of the valve body the lower portion of the fluid chamber is open and and the gate, and stem if desired, can be removed from the interior of the valve for service and repair. In accordance with the invention the gate is designed so that when retracted above and clear of the opposed valve seats it can be rotated with the stem 90° relative to the seat axis and then the rising type valve stem actuated so that the gate passes between the opposed valve seats and out of the bottom of the valve body. The gate is designed so that the portion having the side surfaces opposed to the seating surfaces is of lesser width than the spacing between the valve seats so that when the gate is rotated and lowered it will pass freely therebetween. As a further feature, the opposed valve seats are made as separate sleeves or units which are threadably engaged in the inner ends of the fluid inlet and outlet passages. These sleeves are preferably provided with an interior opening of suitable section, for example hexagonal, so that an Allen key or the like can be inserted through the open bottom of the valve body and the valve seats engaged or disengaged for service or replacement without the necessity of breaking the line connections to the valve. As a still further feature, an inspection plug is provided in the valve closure member so that when in service the valve can be easily checked for internal leakage under full pressure.

Having thus generally described the nature of the invention, particular reference will be made to the accompanying drawings showing a preferred embodiment thereof, and in which:

Figure 1 is a view in side elevation of a gate valve construction in accordance with the invention;

Figure 2 is a plan view of the construction shown in Figure 1;

Figure 3 is a cross-sectional view of the construction of Figure 2 along the line 3—3;

Figure 4 is a cross-sectional partially exploded view corresponding to Figure 3 with the valve gate shown in raised position and rotated 90° in a position where it can be extended and removed from the bottom of the valve body, a suitable wrench or key "A" is indicated in dotted lines to show the manner in which the valve seats can be removed or inserted, with the valve closure member and gate guide shown in withdrawn position;

Figure 5 is a transverse cross-section of the construction of Figure 4 along the line 5—5 to illustrate the relative position and inside tool accommodating recesses of the opposed valve seats;

Figure 6 is an exploded enlarged view of the valve stem, gate, and valve closure member having the bifurcate gate guiding portion to show their construction and relative positions when assembled more clearly.

With particular reference to Figures 1, 2 and 3 of the drawings, a gate valve constructed in accordance with the invention includes a main valve body 10 having a top yoke 12 supporting a cylindrical valve top portion 13 above and concentrically with the valve body 10. The lower portion of the valve body 10 includes aligned transverse extensions 14 and terminates in a rectangular outlined enlarged portion 16 forming the base of the main valve body. The interior of the valve body 10 is recessed axially throughout its length providing a first relatively narrow axial valve stem accommodating and sealing recess 18 and a second recess of greater diameter constituting a cylindrical fluid chamber 20.

The top portion 13 of the valve body 10 is provided with a recess 30 adapted to slidably accommodate the flange 32 of a rotary sleeve 34. The flange 32 of the sleeve 34 is retained for free rotation by a flanged retaining nut 36 threadably engaged with the correspondingly tapped upper portion 31 of the recess 30. Preferably, as illustrated, the valve body top portion 13 is also bored transversely to accommodate a lubricant fitting 40 leading into the recess 30. The interior bore of the sleeve 34 is threaded so as to threadably receive and engage the correspondingly threaded end of an elongated valve stem 44 which extends axially through the valve body 10 into the fluid chamber 20. The valve stem 44 slidably fits through and is aligned axially by a lower packing nut 48 and an upper flanged packing retaining sleeve 50 which fit within the body recess 18 so as to retain and compress a plurality of annular packing rings 46 surrounding the valve stem 44. The lower packing nut 48 is threadably engaged with a correspondingly tapped portion 47a of the recess 18 while the sleeve 50 has a cylindrical portion 50a slidably fitting within the recess 47 and an extended flange portion 50b which is aligned with a correspondingly outstanding flange 11 on the valve body 10 to which it is secured by bolts and nuts 51 extending therebetween. Tightening of the bolts 51 forces the sleeve portion 50a against the packing member 46 so that they are compressed into sealing contact with valve stem 44. The lower locking nut 48 includes a concentric conical recess 49 which is adapted to receive a correspondingly cone-shaped flange 80 on the lower end of the valve stem 44 so as to provide a further seal for the valve stem when the gate is in full open position, to isolate the packing chamber and allow re-packing under full pressure.

In order to provide a means whereby the sleeve 34 can be rotated to actuate the valve stem 44, a valve handle 60 is mounted on the correspondingly tapered middle part 35 of the sleeve 34 and is retained in position by a lock nut 62. With this arrangement, rotation of the sleeve 34, through the handle 60, in one direction acts to move the valve stem 44 axially upwards and rotation in the opposite direction moves the valve stem 44 downwards. As will be appreciated, it is necessary to prevent the valve stem 44 from rotation during its reciprocal movement and this is accomplished by the guiding of a valve gate 70 mounted on the lower end of the valve stem 44.

As is shown most clearly in Figure 6, the lower end of the valve stem 44 is shaped to provide the conical flange 80 and a substantially inverted T-shaped key portion 82. The valve gate 70 is provided with a correspondingly inverted T-shaped slot 71 so that by the sliding engagement of the key 82 within the gate slot 71 the gate is connected to the end of the valve stem 44. The body of the gate valve 70 is of generally rectangular outline with inwardly extending parallel grooves 74 provided in one pair of opposing side surfaces and tapering extensions or valve seat faces 76 provided on the other opposed side surfaces.

The transverse extensions 14 of the valve body 10 are bored to provide inlet 90 and outlet 92 fluid passages. The first portions 90a, 92a, of the passages 90, 92, are tapped to provide a means of connection to suitable conduits with further unthreaded portions 90b, of the passages being of lesser diameter and extending diagonally upwards to terminate in further enlarged tapped portions 90c, 92c, adapted to accommodate valve seat bushings 94 and leading into the body fluid chamber 20. Each of the valve seat bushings 94 is provided with a suitable ground valve face or seating surface 94a adapted to meet a seating face 76 of the gate 70 and each includes an internal recess having a first portion 95 of suitable cross-section (hexagonal in the construction shown) to receive a key or wrench, and a second portion 95a of circular cross-section corresponding with the diameter of the unthreaded bore portions 90b, 92b.

The gate 70 is maintained in the necessary parallel aligned position by a bifurcate gate guiding extension 75 of a valve body closure member 77. The valve closure member 77 includes an outer flange 79 of rectangular outline corresponding to the base 16 of the valve body and a circular boss 81 adapted to fit closely into the lower end of the valve body fluid chamber 20. An annular recess 83 is provided about the base of the boss 81 of the closure member and is adapted to receive an annular sealing gasket 87 which fits into an annular recess 21 provided in the portion of the valve body base 16 surrounding the open end of the fluid chamber 20.

The valve body base 16 is provided with four (4) spaced apart tapped openings and the closure member flange 79 is provided with four (4) correspondingly spaced openings 71 to accommodate retaining bolts 89. A tapped opening 99 is provided through the axial center of the closure member and a threaded inspection plug 100 is engaged in this opening.

The parallel spaced apart guide arms 75a, 75b of the gate guiding extension 75 slidably fit within the gate body grooves 74 so that the reciprocal travel of the gate is positively maintained in alignment to ensure the register of the gate seating faces 76 with the diagonally opposed valve seat faces 94a.

With this arrangement, when it is necessary to remove the gate 70, and/or the valve stem 44 for service or replacement, the valve body closure member 77 is removed, sliding the gate guide arms 75a, 75b from contact with the gate body grooves 74; the gate 70 is then elevated within the body fluid chamber 20 until the seating faces 76 are completely clear of the valve seats 94. The gate 70 is then rotated 90°, for example by a screwdriver or the like, so that the side surfaces bearing the grooves 74 are aligned with the valve seats 94. Since these side surfaces are parallel and spaced apart a lesser distance than the opposed seating faces 76 the gate can now be lowered past the valve seats 94 and out of the body chamber 20. The gate can be removed, if desired, from the valve stem 44 or by continued rotation of the valve handle 60 will cause the stem 44 to descend clear of threaded engagement with the sleeve 34 so that it can also be withdrawn from the interior of the valve body.

If it is desired to remove the valve seat bushings 94, this is also easily accomplished, as shown in broken lines in Figure 4, by the insertion of the offset end of an Allen key or wrench into the correspondingly shaped internal recess 95. The end of the wrench or key is prevented from passing completely through the interior of the bushing 94, which might possibly result in marring the seating face 94a, by the difference in section 95a of the bushing interior bore which being circular provides a shoulder or stop 95b against which the end of the wrench is adapted to bear. As will be understood by reference to the accompanying drawings and preceding description the packing of the valve stem can be also easily removed as can the valve stem actuating sleeve 34, and associated elements without removing the valve from the line.

There is no need for removing the body of the gate valve of the invention from a line for service or maintenance during operation. Further, the elimination of the usual bonnet-body sealed joint reduces the problem of leaks in service as is encountered in the well known gate valve constructions of this type. The main reason for gasket and leakage trouble in standard gate valves having a separate bonnet bolted to the body is through the continuously changing stresses in the material of the retaining bolts under the opening and closing of the valve since the valve stem is located in the bonnet while the seating surfaces are fixedly located in the valve body. The stresses are caused by the actual opening and closing operations of the valve as well as by temperature differentials when the valve is opened or closed. Each time the valve is closed the body of the valve is under the influence of the temperature in the line while the bonnet cools off to room temperature.

The provision of the inspection plug 100 permits the possibility of checking the tightness of the gate and seats during operation in the line. By unscrewing the plug 100, when the gate is in closed position, any leakage through the gate and seats can be detected visually.

If it is desired to more fully inspect the seating of the valve gate during operational service the closure member 77 and gate guide arms 75a, 75b, can be removed as previously described providing a clear view of the interior of the valve.

I claim:

1. A gate valve construction comprising a main valve body including an internal fluid chamber having opposed open ends, an elongated valve stem mounted in one of said body chamber open ends with a portion extending into said chamber for reciprocal movement therein, valve stem actuating means connected to said valve stem, outlet and inlet passages in said body leading into said chamber and valve seats mounted directly in the inner ends of each of said inlet and outlet passages to present opposing seating surfaces disposed obliquely to the axis of said valve stem, a valve gate removably mounted on the portion of said valve stem extending within said chamber, said valve gate having opposite oblique seating surfaces corresponding to and adapted to seat on said opposed valve seat surfaces, a valve closure member removably mounted on said body to seal off said chamber other end, gate guiding means extending within said chamber and adapted to maintain alignment of said valve gate seating surfaces with said valve seat surfaces during reciprocal movement of said gate, the portion of said valve gate intervening said seating surfaces being of lesser width than the minimum spacing between said opposed valve seats whereby by removal of said closure member and gate guiding means said valve gate is adapted to be raised clear of said valve seats, rotated about 90° and extended between said opposed valve seats and removed from said valve stem out of said fluid chamber other open end.

2. A gate valve construction comprising a main valve body having its axis in a vertical plane and including an internal fluid chamber having opposed open ends, an elongated valve stem mounted in one of said body chamber open ends with one end portion extending into said chamber for reciprocal movement therein, valve stem actuating means engaged with the other end of said valve stem extending exteriorly of said chamber, opposed inlet and outlet passages in said body leading into said chamber and valve seats mounted directly in the inner ends of each of said inlet and outlet passages to present opposing seating faces disposed obliquely to the axis of said valve stem, a valve gate removably mounted on the said one end of said valve stem extending within said chamber and having opposite oblique seating surfaces corresponding to and adapted to seat on said opposed valve seats, a valve closure member removably mounted on said body to seal off said chamber other open end and gate guiding means connected to said closure member extending within said fluid chamber and adapted to maintain alignment of said valve gate seating surfaces with said valve seats during reciprocal movement of said gate, the portion of said valve gate intervening said seating surfaces being of lesser width than the minimum spacing between said opposed valve seats whereby by removal of said closure member and gate guiding means said valve gate is adapted to be raised and rotated about 90° enabling it to be lowered between said opposed valve seats and removed from said valve stem out of said fluid chamber other open end.

3. A gate valve construction comprising a main valve body having its axis in a vertical plane and including an internal fluid chamber having opposed open ends, an elongated valve stem mounted in one of said body chamber open ends with an end portion extending into said chamber for reciprocal movement therein, valve stem actuating means mounted within said body engaged with the other exterior end of said valve stem, opposed fluid inlet and outlet passages in said body leading into said chamber and valve seats mounted directly in the inner ends of each of said fluid inlet and outlet passages to present opposed seating faces disposed obliquely to the axis of said valve stem, a valve gate removably mounted on the end of said valve stem extending within said chamber, said gate having opposite seating surfaces corresponding with and adapted to seat on said opposed valve seats with the surfaces of said gate intervening said seating surfaces being provided with gate alignment guiding recesses, the maximum width of said intervening recess bearing surfaces being greater than the minimum spacing between said opposed valve seats and the maximum width of said gate seating surfaces being less than the minimum spacing between said opposed valve seats, and a valve body closure member removably mounted on the other end of said valve body to seal off said fluid chamber beneath said valve seats and including upwardly extending gate guiding portions adapted to slidably engage said gate recess bearing surfaces to align said seating surfaces with said opposed valve seats, said valve body closure member and gate building portions being otherwise free of connection with said valve seats and gate whereby by removal of said closure member and gate guiding portions, raising said valve gate through said valve stem above said valve seats, rotating said gate about 90° and lowering it through said stem past said valve seats, said valve gate is adapted to be removed from said valve stem end portion and out of said fluid chamber open end.

4. A gate valve construction as claimed in claim 2, wherein said valve gate portion intervening said seating surfaces is provided with opposite side surfaces having therein parallel slots and said gate guiding means comprises a pair of spaced apart parallel standards extending from said closure member and adapted to slidably fit in said slots.

5. A gate valve construction as claimed in claim 3, wherein said opposed valve seats each comprises an annular bushing removably mounted in said valve body, the interior of each of said bushings being shaped to constitute a tool-accommodating recess.

References Cited in the file of this patent

UNITED STATES PATENTS

| 1,526,486 | Mueller | Feb. 17, 1925 |
| 1,927,366 | Hall | Sept. 19, 1933 |
| 2,224,231 | Mohr | Dec. 10, 1940 |
| 2,765,143 | Best | Oct. 2, 1956 |

FOREIGN PATENTS

| 259,337 | Great Britain | of 1926 |